United States Patent
Zhang et al.

(10) Patent No.: US 10,763,735 B2
(45) Date of Patent: Sep. 1, 2020

(54) VOICE COIL MOTOR AND ELECTRONIC DEVICE HAVING THE SAME

(71) Applicant: TRIPLE WIN TECHNOLOGY(SHENZHEN) CO. LTD., Shenzhen (CN)

(72) Inventors: Long-Fei Zhang, Guangdong (CN); Shin-Wen Chen, New Taipei (TW); Yu-Shuai Li, Shenzhen (CN); Kun Li, Guangdong (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 17 days.

(21) Appl. No.: 16/262,002

(22) Filed: Jan. 30, 2019

(65) Prior Publication Data
US 2020/0161956 A1    May 21, 2020

(30) Foreign Application Priority Data
Nov. 15, 2018    (CN) .......................... 2018 1 1362359

(51) Int. Cl.
| | | |
|---|---|---|
| *H02K 41/035* | (2006.01) | |
| *H02K 5/06* | (2006.01) | |
| *B23K 26/22* | (2006.01) | |
| *G02B 7/04* | (2006.01) | |
| *G03B 13/34* | (2006.01) | |
| *G03B 5/00* | (2006.01) | |

(52) U.S. Cl.
CPC ........... *H02K 41/0356* (2013.01); *H02K 5/06* (2013.01); *B23K 26/22* (2013.01); *G02B 7/04* (2013.01); *G03B 5/00* (2013.01); *G03B 13/34* (2013.01); *G03B 2205/0046* (2013.01); *G03B 2205/0069* (2013.01)

(58) Field of Classification Search
CPC . G02B 7/04; G03B 5/00; G03B 13/34; G03B 2205/0046; G03B 2205/0069
See application file for complete search history.

(56) References Cited

U.S. PATENT DOCUMENTS

| | | | |
|---|---|---|---|
| 2013/0119785 A1* | 5/2013 | Han | ........................ G02B 7/102 310/12.16 |
| 2013/0154396 A1 | 6/2013 | Chou | |

(Continued)

FOREIGN PATENT DOCUMENTS

| | | |
|---|---|---|
| TW | 200943673 A | 10/2009 |
| TW | 201328129 A1 | 7/2013 |
| TW | 201537974 A | 10/2015 |

*Primary Examiner* — John K Kim
*Assistant Examiner* — Minki Chang
(74) *Attorney, Agent, or Firm* — ScienBiziP, P.C.

(57) ABSTRACT

A voice coil motor includes a housing, a cover plate, an upper elastic member; a movable assembly, an immovable assembly, a lower elastic member, and a base cooperating with the housing to receive the cover plate, the upper elastic member, the movable assembly, the immovable assembly, and the lower elastic member. The base is made of laser direct structuring material. A metal layer is formed on a region of the base connecting the housing by Laser Direct Structuring processes, and the metal layer is fixed on the housing by laser welding or solder paste spot welding. The disclosure also provides an electronic device having the voice coil motor.

18 Claims, 3 Drawing Sheets

(56) References Cited

U.S. PATENT DOCUMENTS

| | | | | |
|---|---|---|---|---|
| 2015/0085148 A1* | 3/2015 | Park | ............... | G02B 7/005 |
| | | | | 348/208.1 |
| 2015/0281532 A1* | 10/2015 | Yu | ............... | H04N 5/2252 |
| | | | | 348/373 |
| 2017/0123180 A1* | 5/2017 | Osaka | ............ | H04N 5/2254 |
| 2018/0017842 A1* | 1/2018 | Hsu | ............... | G03B 7/08 |
| 2018/0372988 A1* | 12/2018 | Hu | ............... | H02K 41/0356 |
| 2019/0346656 A1* | 11/2019 | Ho | ............... | G02B 7/09 |

\* cited by examiner

VOICE COIL MOTOR AND ELECTRONIC DEVICE HAVING THE SAME

FIELD

The subject matter herein generally relates to a voice coil motor and an electronic device having the voice coil motor.

BACKGROUND

Voice coil motors are commonly used to drive lenses in camera modules. The voice coil motor uses the electromagnetic drive principle of the energized coil and the magnet to drive the lens. The voice coil motor generally includes a base, a fixed barrel, a movable barrel, a coil and a magnet. One of the coil and the magnet is fixed to the fixed barrel, and the other is fixed to the outer wall of the movable barrel. The lens can be received in the movable barrel. To prevent electromagnetic leakage and electromagnetic interference, the voice coil motor typically has an electromagnetic shielding housing that receives the voice coil motor therein.

The voice coil motors are becoming thinner, the effective stroke of the voice coil motors are becoming higher, the thickness of the base is becoming thinner. As a result, the risk of the base and the housing breaking apart is becoming higher because the strength of the base decreases and the adhesion between the base and the housing is reduced as the base becomes thinner. So that the housing and the base may be easily separated when in use.

BRIEF DESCRIPTION OF THE DRAWINGS

Implementations of the present disclosure will now be described, by way of embodiments, with reference to the attached figures.

DETAILED DESCRIPTION

Figure 1:
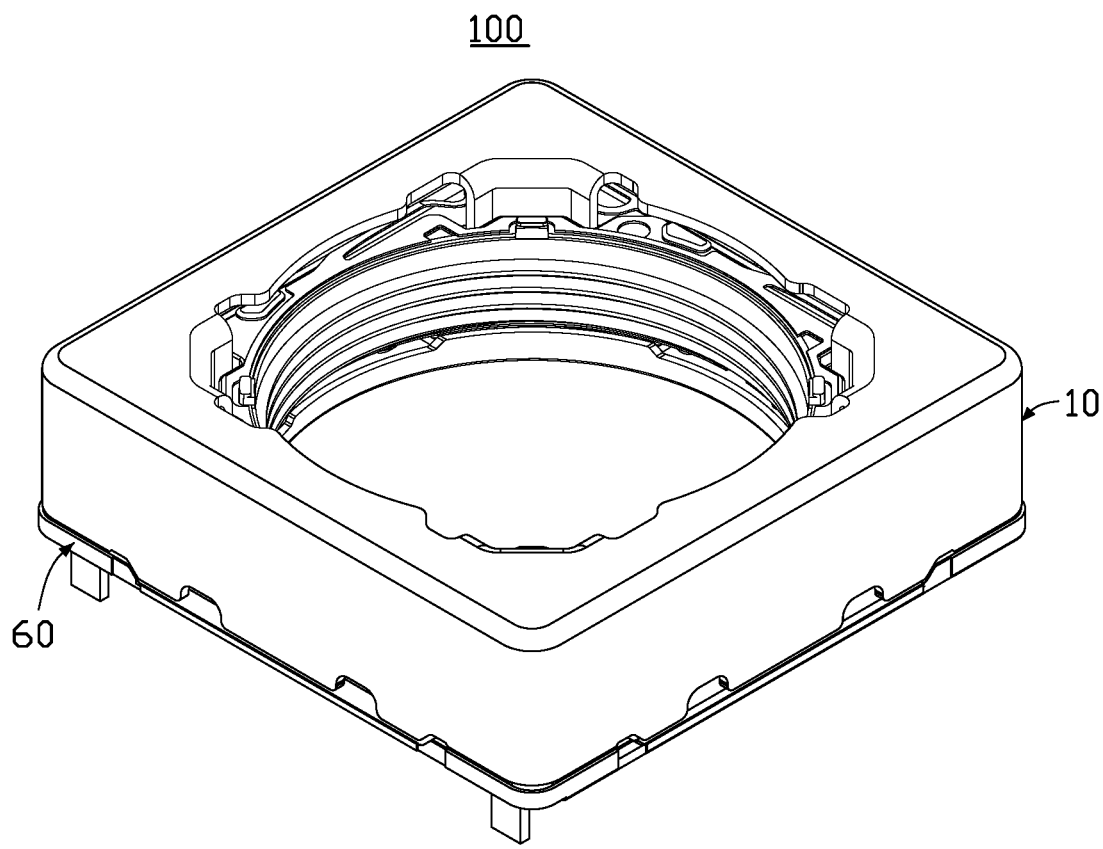
FIG. 1 is a diagram of an embodiment of a voice coil motor.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

Figure 2:
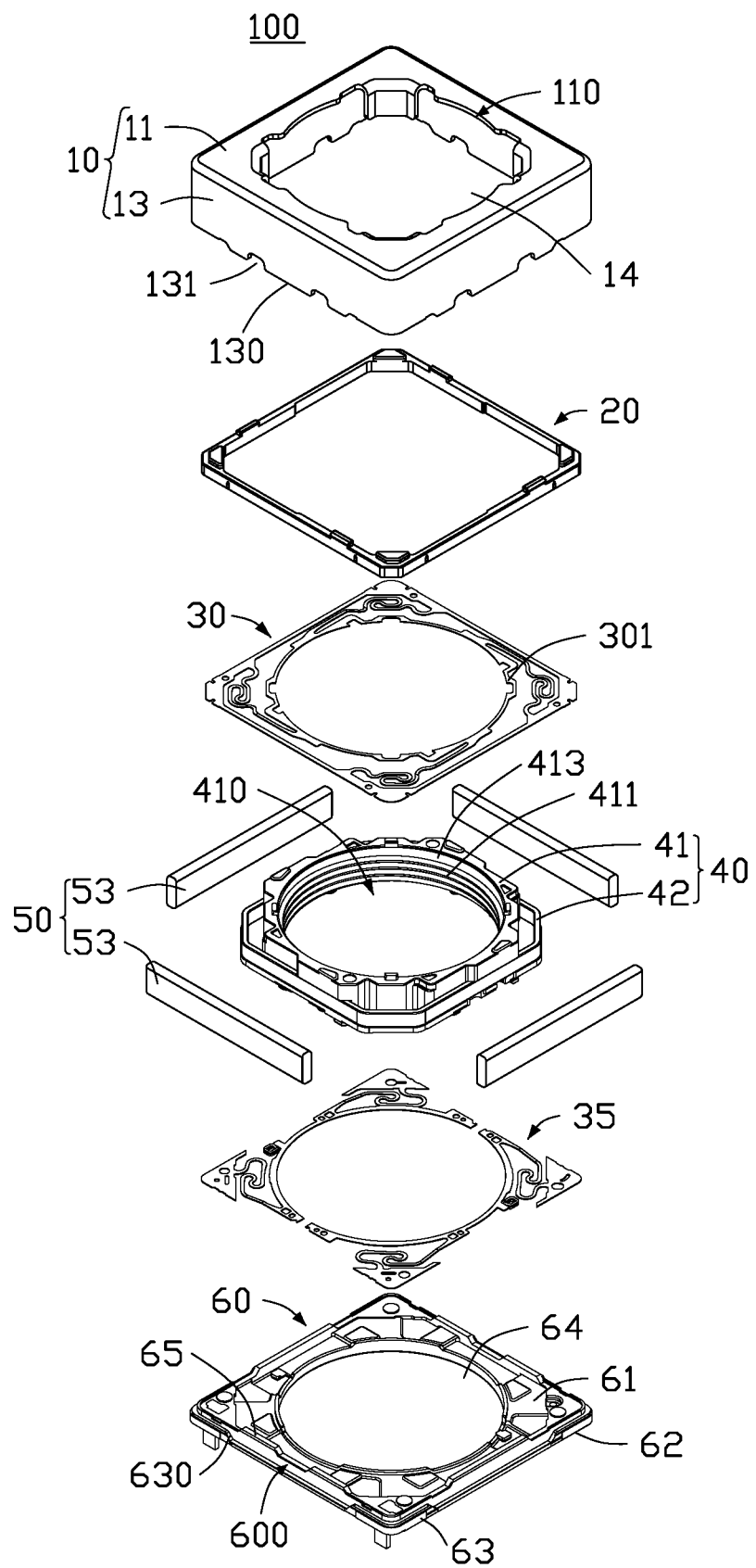
FIG. 2 is an exploded, diagrammatic view of the voice coil motor of FIG. 1.

FIGS. 1 and 2 illustrate an embodiment of a voice coil motor 100 to drive a lens module (not shown) to move along a direction parallel to an optical axis of the lens module. A zoom function or a focus function can be achieved.

The voice coil motor 100 comprises a housing 10, a cover plate 20, an upper elastic member 30, a movable assembly 40, an immovable assembly 50, a lower elastic member 35, and a base 60.

The housing 10 comprises a top plate 11 and four sidewalls 13 each perpendicularly extending from the periphery of the top plate 11. The top plate 11 and the four sidewalls 13 cooperatively form a receiving space 14 to receive the cover plate 20, the upper elastic member 30, the movable assembly 40, the immovable assembly 50, the lower elastic member 35, and the base 60. The top plate 11 defines a first through hole 110.

In at least one embodiment, at least two protrusion parts 130 protrude from an end portion of each sidewall 13 facing away from the top plate 11 toward a direction facing away from the top plate 11. The at least two protrusion parts 130 are spaced from each other, and a groove 131 is defined between two adjacent protrusion parts 130. In at least one embodiment, three protrusion parts 130 form on each sidewall 13. An area of the protrusion part 130 in the middle of the side wall 13 is greater than an area of the protrusion part 130 on either side.

In at least one embodiment, the housing 10 can be made of metal material. In another embodiment, the housing 10 can be made of other electromagnetic shielding material.

In another embodiment, the housing 10 may be made of laser direct structuring material, and the housing 10 comprises a metallized inner surface (not shown) formed by Laser Direct Structuring processes.

The base 60 is made of laser direct structuring material. The base 60 cooperates with the housing 10 to receive the cover plate 20, the upper elastic member 30, the movable assembly 40, the immovable assembly 50, and the lower elastic member 35. A metal layer 600 is formed on a region of the base 60 connecting the housing 10 by Laser Direct Structuring processes. The metal layer 600 is fixed on the housing 10 by laser welding or solder paste spot welding.

In at least one embodiment, the base 60 comprises a supporting surface 61, a bottom surface 62 facing away from the supporting surface 61, and side surfaces 63 connecting the periphery of the supporting surface 61 and the periphery of the bottom surface 62. A second through hole 64 passing through the supporting surface 61 and the bottom surface 62 is defined. The metal layer 600 is formed on the side surfaces 63. The housing covers on the base 60. The sidewalls 13 of the housing 10 and the side surfaces 63 of the base 60 are fixed together by laser welding or solder paste spot welding.

In at least one embodiment, glue can be filled into a gap between the side surfaces 63 of the base 60 and the sidewalls 13 of the housing 10, to increase a tightness between the housing 10 and the base 60, thereby prevent pollutant (such as external dust) from entering the voice coil motor 100 through the gap between the base 60 and the housing 10. Also, a fastness of the connection between the housing 10 and the base 60 can be further improved by the glue.

When the sidewalls 13 of the housing 10 and the side surfaces 63 of the base 60 are fixed together by solder paste spot welding, the solder paste is coated on the side surfaces 63 and corresponds to the groove 131. As a result, the solder paste can be sufficiently contacted with the base 60 and the housing 10 to improve the fastness of the connection between the housing 10 and the base 60.

In at least one embodiment, at least middle region of each side surface 63 is recessed toward a central axis of the second through hole 64 to form a mounting portion 630. The protrusion part 130 corresponds to the mounting portion 630. The base 60 further comprises protrusion portions 65 each extending from the periphery of the supporting surface 61 toward a direction facing away from the bottom 62. The protrusion portions 65 and the sidewalls 13 of the housing 10 are further fixed by the glue.

In another embodiment, the metal layer can be formed on the protrusion portions 65 by Laser Direct Structuring process. So the protrusion portions 65 and the sidewalls 13 can be fixed together by laser welding.

The movable assembly 40 comprises a lens mount 41 and coils 42. The lens mount 41 defines a center hole 410 and comprises an inner surface 413. Threads 411 are formed on the inner surface 413 to be used for mounting the lens module. The coils 42 are wrapped around the lens mount 41. The immovable assembly 50 comprises a plurality of magnetic members 53. In at least one embodiment, the immovable assembly 50 comprises four magnetic members 53 mounted on inner sides of the sidewalls 13 of the housing 10.

The cover plate 20 is located between the top surface of each magnetic member 53 and the top plate 11. The upper elastic member 30 is sandwiched between the cover plate 20 and the magnetic members 53. A free end portion 301 of the upper elastic member 30 facing away from the sidewalls 13 of the housing 10 protrudes toward a central axis of the first through hole 110, and positions above the lens mount 41.

The lower elastic member 35 is fixed on the supporting surface 61 of the base 60. The lens mount 41 is mounted on the lower elastic member 35. When the lens mount 41 is driven upward, the free end portion 301 of the upper elastic member 30 can be used to limit the upward moving range of the lens mount 41.

Because the base 60 is made of laser direct structuring material, the metal layer 600 is formed by the base 60 through Laser Direct Structuring processes. As a result, the metal layer 600 is not easy to be separated from the base 60, the fastness of the connection between the housing 10 and the base 60 can be improved. The formation of the metal layer 600 does not increase the thickness of the base 60, which is conducive to the miniaturization of the base 60, even the miniaturization of the voice coil motor 100.

Figure 3:
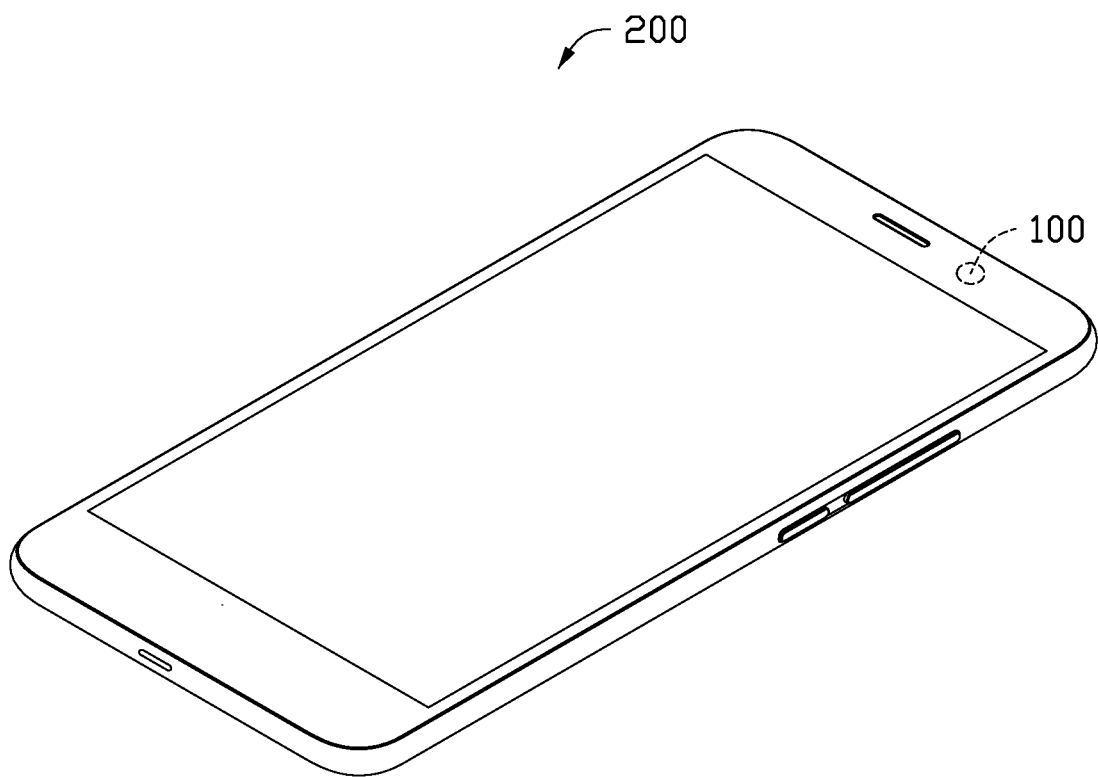
FIG. 3 is diagram of an embodiment of an electronic device having the voice coil motor of FIG. 1.

Referring to FIGS. 1 and 3, the voice coil motor 100 can be used in an electronic device 200. The electronic device 200 can be a mobile phone, a laptop, a camera or others.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A voice coil motor comprising:
    a housing;
    a cover plate;
    an upper elastic member;
    a movable assembly;
    an immovable assembly;
    a lower elastic member; and
    a base cooperating with the housing to receive the cover plate, the upper elastic member, the movable assembly, the immovable assembly, and the lower elastic member;
    wherein the base is made of laser direct structuring material, a metal layer is formed on a region of the base connecting the housing by Laser Direct Structuring processes, the base comprises a supporting surface and a bottom surface facing away from the supporting surface, the base further comprises protrusion portions each extending from a periphery of the supporting surface toward a direction facing away from the bottom surface, the metal layer is formed on each of the protrusion portions, the metal layer is fixed to each of the sidewalls of the housing by laser welding.

2. The voice coil motor of claim 1, wherein the voice coil motor further comprises a glue filled between the base and the housing.

3. The voice coil motor of claim 1, wherein the housing comprises a top plate and four sidewalls each perpendicularly extending from the periphery of the top plate, at least one groove is defined on an end portion of each of the four sidewalls facing away from the top plate, each of the four sidewalls is fixed to the base at the groove by solder paste spot welding.

4. The voice coil motor of claim 3, wherein at least two protrusion parts protrude from the end portion of each of the four sidewalls facing away from the top plate toward a direction facing away from the top plate, the at least two protrusion parts are spaced from each other, each of the at least one groove is defined between adjacent two of the protrusion parts of each of the four sidewalls.

5. The voice coil motor of claim 4, wherein three protrusion parts are formed on each of the four sidewalls and spaced from each other, an area of the protrusion part in the middle of each of the sidewalls is greater than an area of the protrusion part on either side of the protrusion part in the middle.

6. The voice coil motor of claim 1, wherein the housing is made of metal material.

7. The voice coil motor of claim 1, wherein the housing is made of laser direct structuring material, and the housing comprises a metallized inner surface formed by Laser Direct Structuring processes.

8. The voice coil motor of claim 7, wherein the base further comprises side surfaces each connecting the periphery of the supporting surface and a periphery of the bottom surface, the metal layer is formed on each of the side surfaces.

9. The voice coil motor of claim 8, wherein the base further comprises protrusion portions each extending from the periphery of the supporting surface toward a direction facing away from the bottom surface, each of the protrusion portions is fixed to a corresponding one of the sidewalls of the housing by a glue.

10. An electronic device comprising:
    a voice coil motor comprising:
    a housing,
    a cover plate;
    an upper elastic member;
    a movable assembly;
    an immovable assembly;
    a lower elastic member; and
    a base cooperating with the housing to receive the cover plate, the upper elastic member, the movable assembly, the immovable assembly, and the lower elastic member;

wherein the base is made of laser direct structuring material, a metal layer is formed on a region of the base connecting the housing by Laser Direct Structuring processes, the base comprises a supporting surface and a bottom surface facing away from the supporting surface, the base further comprises protrusion portions each extending from a periphery of the supporting surface toward a direction facing away from the bottom surface, the metal layer is formed on each of the protrusion portions, the metal layer is fixed to each of the sidewalls of the housing by laser welding.

11. The electronic device of claim 10, wherein the voice coil motor further comprises a glue filled between the base and the housing.

12. The electronic device of claim 10, wherein the housing comprises a top plate and four sidewalls each perpendicularly extending from the periphery of the top plate, at least one groove is defined on an end portion of each of the four sidewalls facing away from the top plate, each of the four sidewalls is fixed to the base at the groove by solder paste spot welding.

13. The electronic device of claim 12, wherein at least two protrusion parts protrude from the end portion of each of the four sidewalls facing away from the top plate toward a direction facing away from the top plate, the at least two protrusion parts are spaced from each other, each of the at least one groove is defined between two adjacent protrusion parts of each of the four sidewalls.

14. The electronic device of claim 13, wherein three protrusion parts are formed on each of the four sidewalls and spaced from each other, an area of the protrusion part in the middle of each of the sidewalls is greater than an area of the protrusion part on either side of the protrusion part in the middle.

15. The electronic device of claim 10, wherein the housing is made of metal material.

16. The electronic device of claim 10, wherein the housing is made of laser direct structuring material, and the housing comprises a metallized inner surface formed by Laser Direct Structuring processes.

17. The electronic device of claim 16, wherein the base further comprises side surfaces each connecting the periphery of the supporting surface and a periphery of the bottom surface, the metal layer is formed on each of the side surfaces.

18. The electronic device of claim 17, wherein the base further comprises protrusion portions each extending from the periphery of the supporting surface toward a direction facing away from the bottom surface, each of the protrusion portions is fixed to a corresponding one of the sidewalls of the housing by a glue.

* * * * *